Nov. 24, 1959
P. M. SCHROTER
2,913,830
ANGLE BLOCK
Filed Jan. 9, 1956
2 Sheets-Sheet 1
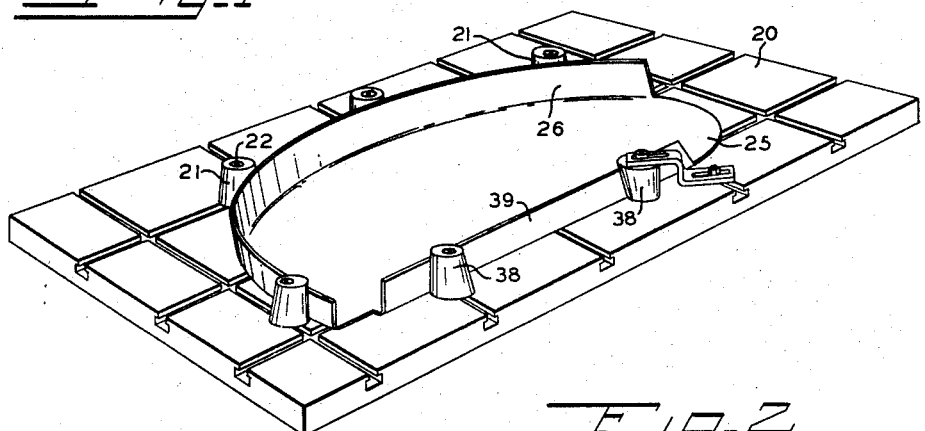
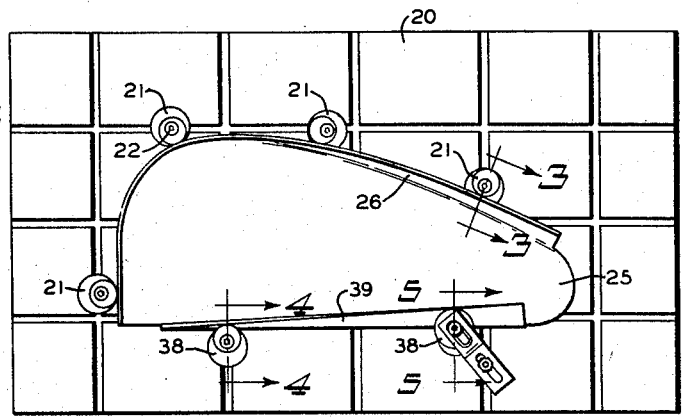
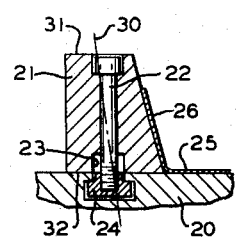
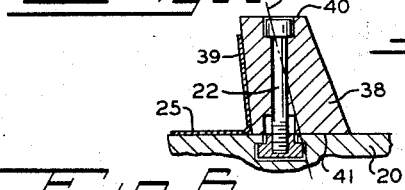
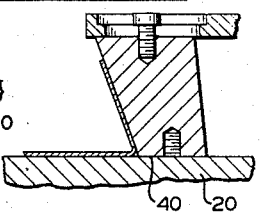
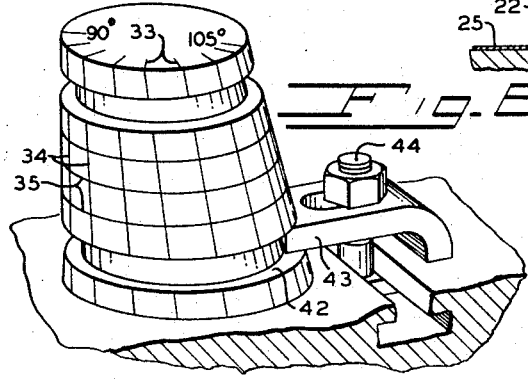
INVENTOR.
PAUL M. SCHROTER
BY
DES JARDINS, ROBINSON & KEISER
HIS ATTORNEYS

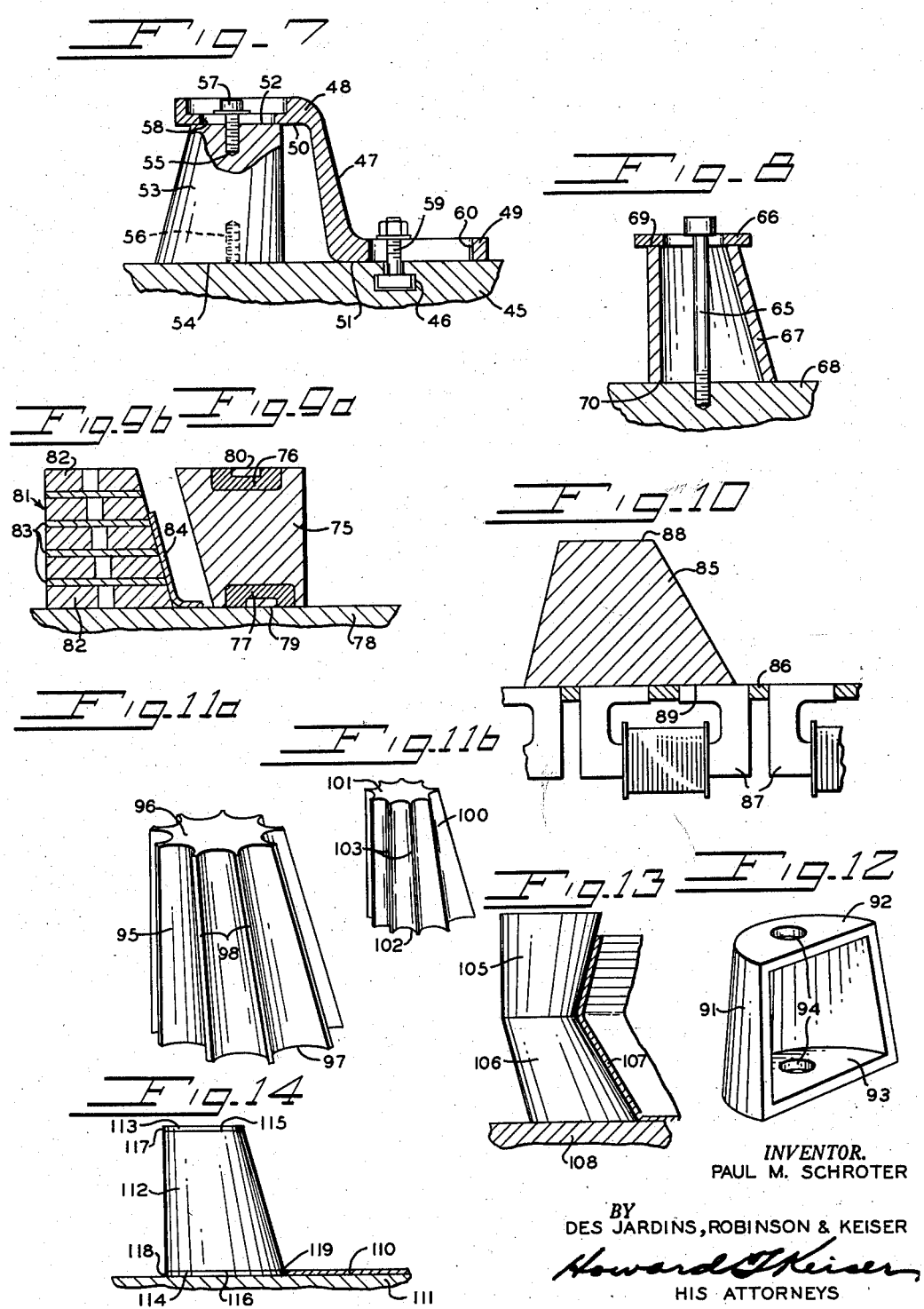

United States Patent Office 2,913,830
Patented Nov. 24, 1959

2,913,830

ANGLE BLOCK

Paul M. Schroter, Reading, Ohio

Application January 9, 1956, Serial No. 558,065

1 Claim. (Cl. 33—174)

This invention relates to an angle block which finds particular use in the checking of flanged parts to ascertain whether or not the flange formed thereon is of proper configuration as required by the drawing of the part. More specifically, the present invention has for its object the provision of a series-angle block which is capable of adjustment to present different angles of inclination to the flange to be checked so that the same block may be used for different setups involving flanges of varying angles of inclination.

It has heretofore been the practice in connection with the inspection and checking of flanged parts to construct a checking fixture using specially machined angle blocks in order to check the inclination of the flange at different locations along the part. The pieces undergoing inspection are checked by placing them in the fixture thus prepared and the coincidence of the flange with the machined edges of the angle blocks is observed by visual inspection. To facilitate checking, the fixture is sometimes constructed so as to provide a predetermined clearance between the blocks and the flange of the part being checked, and the inspection is made by inserting a feeler gauge between the blocks and the flange. It has also been customary, in the past, to construct similar fixtures for use in assembling flanged parts preparatory to fastening them together, and also for service as a milling fixture where the flange must be backed up during the machining operation to prevent its springing out of shape due to the thrust exerted by the cutter against the face of the flange.

Fixtures constructed in this manner are quite costly due to the time and labor involved in machining the various angle blocks required for the fixture and in locating and assembling these blocks on the surface plate of the fixture. It was with a view to reducing the cost of such fixtures that I devised the novel angle block hereinafter to be described and claimed. My new form of block may aptly be termed a series-angle block since it is designed to present, to the part being checked, any one of a series of different working faces each of which is inclined at a different angle with respect to the gauging surface of the fixture. The selected working face of the block is moved into position by simply turning the block until it is brought into alignment with the flange to be checked.

Accordingly, it is an object of the present invention to provide an angle block of unique design which may be adjusted to check flanges of different angles.

Another object of this invention is to provide an angle block which may be readily adjusted to present any desired angle of inclination to the flange to be checked within a predetermined range of angles.

Another object of the invention is to provide an angle block which may be adjusted so as to present a limited number of predetermined angles of inclination to the flange being checked.

Another object of the invention is to provide an adjustable angle block having indicia inscribed thereon for facilitating adjustment of the block to present a selected working face to the flange being checked.

Another object of the invention is to provide means for holding the angle block referred to in the preceding objects in any of its adjusted positions.

Another object of the invention is to provide a flange checking fixture in which a plurality of rotatable checking blocks are so arranged on the face of a surface plate as to present the proper angles to the flanged part which is to be checked.

With these and other objects in view which will become apparent from the following description, the invention includes certain novel features of construction and combinations of parts the essential elements of which are set forth in the appended claims and a preferred form or embodiment of which will hereinafter be described with reference to the drawings which accompany and form a part of this specification.

In the drawings:

Fig. 1 is a perspective view of a flange checking fixture constructed in accordance with the principles of my invention.

Fig. 2 is a plan view of the fixture shown in Fig. 1.

Fig. 3 is a cross-sectional view taken along the line 3—3 in Fig. 2.

Fig. 4 is a cross-sectional view taken along the line 4—4 in Fig. 2.

Fig. 5 is a cross-sectional view taken along the line 5—5 in Fig. 2.

Fig. 6 is a perspective view of one particular form of my improved angle block together with a specific form of hold down means.

Fig. 7 is a side elevation, partially in cross-section, showing one of my blocks held in place with a different type of fastening means.

Fig. 8 is a cross-sectional elevation of a hollow flange block together with a suitable form of fastening means therefor.

Fig. 9a is a cross-sectional elevation of a flange block provided with permanent magnets therein for holding it in place on a steel surface plate.

Fig. 9b is a cross-sectional elevation of a modified form of magnetic block.

Fig. 10 is a cross-sectional view taken through a magnetic surface plate with a block of different configuration shown thereon.

Fig. 11a is a perspective view of a modified form of angle block which is provided with a limited number of working faces.

Fig. 11b is a perspective view of a block similar to that shown in Fig. 11a but having vertically disposed working faces.

Fig. 12 is a perspective view of a modified form of angle block.

Fig. 13 is a side elevation of a set-up in which two blocks, mounted one on top of the other, are provided for checking a double-angle flange.

Fig. 14 is a side elevation of a block provided with template stock shims for use in fixtures employing a template of the part being checked.

In Figs. 1 and 2 of the drawings is shown a flange checking fixture constructed and arranged in accordance with the teachings of my invention. As shown in the figures, the fixture includes a surface plate 20 which may be a flat plate of steel or other suitable rigid material which provides a plane supporting surface for the part being checked and also affords a suitable base upon which angle blocks 21 may be mounted as shown. The blocks 21 may be held in place on the plate 20 by means of recessed-head cap screws 22 (Fig. 3) which are received within a bore provided therefor in the blocks 21. A counterbore 23 is preferably provided at each end of the block 21 for receiving the head of the screw 22 so as to permit it to lie flush with, or slightly beneath, the end face of the block. Tapped nuts 24 may be received in T-slots provided in the plate 20 for receiving the threaded ends of the screws 22, the nuts being located in the slots in whatever positions may be necessary for properly locating the blocks on the plate to provide the desired angle check of the flange on the part being inspected. The method of inspection is illustrated in Figs. 1 and 2 in which a formed sheet metal part 25 provided with an upturned flange 26 is shown inserted in the checking fixture which serves to gauge the angle of inclination of the flange 26 at the various positons therealong where the angle blocks 21 are located.

One of the principal features of my invention is to provide angle blocks which are adjustable to present differently disposed working faces to the flanged part being inspected so that the same block may be used with different checking fixtures and/or in different set-ups for determining the acuracy of flanges inclined at various angles with respect to the body of the part. In the past it has been customary to provide specially machined angle blocks for each different flange angle to be checked so that new blocks had to be made for each fixture that was built. However, by providing blocks constructed in accordance with the teachings of my invention, this costly, time consuming procedure is no longer required and, by maintaining on hand a small supply of my series-angle type of blocks, a flange checking fixture may be quickly constructed for use in inspecting the dimensional accuracy of flanged parts, the assembly of two or more flanged pieces into one part, or to provide support for a flang which is to be machined to a predetermined dimension.

According to one embodiment of my invention, the block takes the form of a frustum, one or both ends of which are flat, finished surfaces inclined with respect to the axis of symmetry of the frustum so as to lie at a predetermined angle with respect to a plane perpendicular thereto. Alternatively, the block may be given the shape of a multi-sided pyramid, or of a generally tapering body having a series of discrete working faces disposed at different angles with relation to the flat face formed on the end thereof.

Considering first the frusto-conical type of block shown in Figs. 1 to 10, inclusive, it will be noted that these may be made in somewhat different forms and shapes all coming within the scope of the present invention. In the case of the block 21 shown in cross-section in Fig. 3, the body of the block may be made of any rigid material having suitable dimensional stability for the particular type of service in which it is to be employed. The body of the block may advantageously be made of a castable material such as aluminum, Kirksite, Meehanite, Cerromatrix, Cerrobend, ceramic or plastic material, plaster, or glass. Alternatively, the block body may be formed of material which is suitable for machining, grinding or plating, such as cold rolled and hot rolled steel which can be case hardened if desired; tool steel which may be hardened, ground, plated and lapped; cemented hard carbide material which may be ground and lapped; granite or stone with steel inserts or permanent magnets embedded therein; aluminum, cast iron, Meehanite, brass, or magnesium. If desired, the block body can be fabricated of compressed material such as paper, or it may be formed of material which can be spun or drawn and either left hollow or subsequently filled with a material which will provide rigidity to the body.

The body shown in Fig. 3 is a portion of a cone having an included angle of 15° at its vertex so that its longitudinal axis, indicated by dot-dash line 30 in Fig. 3, makes an angle of 7½° with respect to the sides of the body. The flat, surfaced top and bottom faces 31 and 32, respectively, of the body 21 are preferably parallel to one another and are inclined with respect to the axis 30 so as to lie at an angle of 82½° with respect thereto, or at an angle of 7½° with respect to a plane disposed perpendicular to the axis 30. Hence, when the block is placed with its face 32 bearing upon a flat surface such as the plate 20 as shown in Fig. 3, one side of the block will be perpendicular to the surface upon which it rests, while the other side of the block will make an angle of 105° with respect thereto, or 15° with respect to a line or plane disposed perpendicular to the surface of the plate. The sides of the block intermediate these extremes will present an infinite number of working faces varying from 90° to 105° with respect to the surface of the plate, or from 0° to 15° with respect to a line or plane normal to the plate. Hence, by turning the block 21 (Fig. 3) about the screw 22 before it is tightened, any desired flange angle of from 90° to 105° may be accommodated by the block. Additionally, the block may be inverted to provide closed angles varying from 75° to 90°.

To facilitate selecting the correct rotational setting of the block, a degree scale may be provided on the top and bottom faces thereof and may also, if desired, be extended down the sides of the block. Such scales are indicated at 33 and 34 in Fig. 6. Additionally, the sides of the block may be provided with a vertical scale, as indicated by reference numeral 35 in Fig. 6, to provide a means for measuring the height of the flange.

In Figs. 4 and 5 is shown a series-angle block 38 which, like the block 21 is in the form of a frustum of a cone but, unlike the block 21, is provided with end faces which have a greater angle of inclination with respect to the longitudinal axis of the cone so as to provide a greater range of angles presented by the side faces of the block. The top and bottom faces 40 and 41 of the block 38 are cut so as to lie at an angle of approximately 12½° at right angles to the axis of the block which is indicated by the dot-dash line 42 in Fig. 4. The cone from which the block 38 is formed is the same as that from which the block 21 was formed, i.e., a cone having an included angle of 15° at the vertex, so that there will thereby be provided a block which, when resting on its bottom face 41, as shown in Fig. 4, will serve to check flange angles varying from 85° to 110°. The angle of the flange 39 at the location shown in Fig. 4 is 85°. The side of the block opposite the flange 39 in Fig. 4 is inclined at an angle of 20° with respect to the vertical so that this face of the block corresponds to a flange angle of 110°. By turning the block about its anchoring screw 22 any flange angle lying between 85° and 110° may be checked.

For checking flange angles of less than 85°, the block 38 may be inverted as shown in Fig. 5 to provide a check of flange angles varying from 70° to 95°. The angularity of the flange 39 at the location shown in Fig. 5 is 70° and, by turning the block 38, flange angles varying from 70° to 95° may be checked by the block.

Means other than a cap screw passing through a bore in the angle block may be used for holding the block in position on the surface plate in its adjusted position so as to provide, with other similar angle blocks, a flange checking fixture.

As shown in Fig. 6, the block may be provided adjacent each end with a circumferential groove, each groove being provided with an annular face 42′ lying in a plane substantially parallel to the adjacent end face. The block is held in position on the surface plate by a clamp which comprises a slotted angle-bracket 43 and a clamping bolt 44 which passes through the slot in the bracket and has its head anchored in a T-slot in the surface plate.

Another desirable type of holding means for use in connection with a surface plate 45 provided with conventional T-slots 46 therein is shown in Fig. 7 and comprises a bracket 47 which is provided with a pair of offset arms 48 and 49 each of which is provided on its underside with a flat bearing surface 50 and 51, respectively. The surface 51 is adapted to bear against the face of the plate 45 while the surface 50 is adapted to bear against the top face 52 of a series-angle block 53 having a bottom face 54 adapted to seat upon the surface of the plate 45. The top and bottom faces 52 and 54 of the block 53 are bearing surfaces which provide accurate seating of the block on the face of the surface plate 45 and on the surface 50 of the bracket 47. The block 53 is provided on each end with tapped holes 55 and 56 for receiving a clamping screw 57 which is received in a counterbored slot 58 provided in the arm 47 of the bracket. The bracket is in turn secured to the surface plate 45 by means of the bolt 59 which is received in a slotted opening 60 in the arm 49 of the bracket and disposed with its head engaged in one of the T-slots in the plate 45. The slotted holes 58 and 60 permit adjustment of the bracket and the block 53 as may be necessary in order to properly locate the block for a particular flange checking setup.

A still different type of clamping means is shown in Fig. 8 in which a clamping screw 65 and a slotted disc or plate 66 is provided for clamping a hollow or shell-type angle block 67 to a surface plate 68. The block 67 is provided with flat, finished top and bottom faces 69 and 70, respectively, so as to provide for accurate seating of either end of the block on the flat surface of the plate 68. Rotational and sidewise adjustment of the block to provide accurate location thereof with respect to the part being checked is provided by the slotted disc 66.

In Fig. 9a is shown an angle block 75 constructed of non-magnetic material and having incorporated therein permanent magnets 76 and 77 for holding the block in place on a steel surface plate 78. The poles of the magnets 76 and 77 are arranged to lie substantially flush with the flat, finished top and bottom faces 79 and 80 of the block so as to form a strong magnetic attachment of the block to the plate when it is seated thereon. A modification of this design is shown in Fig. 9b wherein a block 81 is formed of a plurality of washer-shaped permanent magnets 82 separated by discs 83 of non-magnetic material. The magnets and discs are cemented or otherwise fastened together to form a unitary body which is shaped to the desired configuration. The magnets 82 on either end of the block provide the necessary magnetic attraction to hold the block in place on a steel surface plate. All of the magnets 82 will also act to draw a flange 84 formed of steel or other magnetic material against the side of the block which will serve to facilitate checking of undersize parts and to hold in position flanged parts which are to be machined while backed up by the angle blocks.

Alternatively, the block may be made of magnetic material and the magnets may be placed in the surface plate so as to secure the block thereto when it is placed on the plate. This arrangement is shown in Fig. 10 wherein a series-angle block 85 formed of magnetic material is shown seated upon a magnetic surface plate 86 embodying electromagnets 87 whose pole pieces form a part of the top face of the plate. The block 85 is of somewhat different form than the previously illustrated blocks in that it constitutes a frustum of a cone having an included angle of 45° at its vertex. The flat, finished top and bottom faces 88 and 89, respectively, of the block are inclined at an angle of 7½° with respect to a plane normal to the longitudinal axis of the block. The sides of the block therefore vary from 105° to 120° with respect to the surface of the plate 86 and are useful for checking open angle flanges lying within this range of angles. If the block is inverted so that its top face 88 rests upon the surface of the plate 86, closed angle flanges varying from 60° to 75° may be checked by use of the block.

The magnetic form of attachment may also be utilized for holding the blocks in place on a sheet of vellum or vinylite laid over the surface plate and having inscribed thereon the outside mold line of the part. The blocks are located with their edges on the mold line and rotated to the angle called for by the drawing to thereby provide a checking fixture for the parts.

A modified form of series-angle block is shown in Fig. 11a in which a plurality of discrete, working faces are provided. As shown in the figure, the block 95 is provided with flat, finished top and bottom faces 96 and 97 for seating upon a flat surface plate. The sides of the block, however, are so shaped as to provide only a limited number of working faces 98 which lie on the surface of a cone and, therefore, as in the case of the blocks previously described, provide faces having different degrees of inclination with respect to the bottom face 97 or top face 96. In the case of the block 95, the edges 98 are formed by fluting the sides of the frustum although a somewhat comparable result could be obtained by providing flat sides on the block so as to constitute the same a portion of a pyramid. The inclination of the top and bottom faces with respect to a plane normal to the longitudinal axis of the block may be made as desired, it being realized, of course, that the smaller the angle of inclination, the smaller the range of flange angles which can be checked by the block. With larger angles of inclination, a greater range of flange angles can be checked by the block but with somewhat less accuracy since the faces 98 lying in the center of the range will not extend perpendicular to the face of the surface plate but will be inclined or slanted sideways with respect thereto. The degree of this sidewise inclination will depend upon the angle which the faces 96 and 97 make with respect to the axis of the block. Also, it is to be realized that this inaccuracy exists only in the intermediate range of angles provided by the block and does not obtain at the ends of the range where the working faces are again perpendicular to the face of the surface plate upon which the block rests.

The above-noted inaccuracy with respect to the intermediate angle values may be eliminated by making the block in the form shown in Fig. 11b. In this instance, the series-angle block 100 is provided with flat, finished top and bottom faces 101 and 102, respectively, which are inclined at a suitable angle with respect to the axis of the block. The working faces 103, however, do not lie on the surface of a cone but, in each case, are made to present straight edges to the face of the flange being checked and each lie perpendicular to the end faces 101 and 102 and to the surface on which the block rests. Hence, a highly accurate check of the angularity of the flange being inspected may be made regardless of the degree of inclination of the faces of the block with respect to the axis thereof.

In the case of either the block shown in Fig. 11a or in Fig. 11b, suitable indicia may be placed upon the top and bottom faces thereof for indicating the flange angles to be checked thereby.

In each of the heretofore described series-angle blocks in which the working faces lie on the surface of a cone, the intermediate range of angles provided by the opposite side surfaces of the block are the same with the possible exception of the form of block shown in Fig. 11a in which the faces 97 may be so located as not to provide duplicate angles on opposite sides of the block. To avoid this duplication of angles, the block may be cut in half and each half-block utilized as a series-angle checking block. One possible form of half-block is shown in Fig. 12, this block comprising a semiconical hollow body 91 having closed ends 92 and 93 provided with apertures 94 for receiving a clamping screw or bolt. The body may conveniently be formed on a press from sheet metal stock, or it may be cast or molded if desired. The ends 92 and 93 present flat bearing surfaces adapted to seat accurately upon the surface plate of the fixture, and the bearing surfaces are, as previously described herein, inclined at a suitable angle with respect to the longitudinal axis of the block so as to provide the desired range of angles for checking purposes. The ends 92 and 93 may be constituted by permanent magnets of semicircular shape which will serve to hold the block in place on a steel surface plate when either end is seated thereupon.

It may be found advantageous to utilize other sections of my series-angle block than the half-block just described. For example, the opposite sides of the block may be flattened to provide flat, parallel sides on the block and to leave remaining thereon only that limited range of angles which is necessary for a particular purpose. This flattening may, of course, be accomplished so as to remove the duplicate angle ranges on opposite sides of the block if desired. This flattened form of block may be useful where it is necessary to crowd the blocks close together to provide a greater number of check points.

My improved form of angle blocks lend themselves to various adaptations for different types of setups which will readily suggest themselves to the user of the blocks. For example, as shown in Fig. 13, the blocks may be mounted one on top of the other to provide for a check of a double-angle flange 107, the blocks being fastened in any suitable manner to the surface plate 108. As shown in Fig. 14, the blocks may also be adapted for use with a setup in which a template 110 of the part to be checked is mounted on a surface plate 111. In this case each angle block 112 is preferably provided with a disc of template stock 113 and 114 cemented or otherwise secured to its flat, finished top and bottom faces 115 and 116, respectively. The edges 117 atnd 118 of the discs 113 and 114 are disposed at right-angles to the surface of the template stock so that when the block 112 is moved against the outside mold line of the template 110, the bottom corner 119 of the block will abut the top edge of the template and thereby accurately locate the block with respect to the template. After the blocks have been thus arranged around the edge of the template and rotatably adjusted to present the correct working face to the flange to be inspected, the part may be placed in the fixture and an accurate check of the flange formed thereon will be provided by the angle blocks.

While I have described my invention in connection with certain possible forms or embodiments thereof and, have used, therefore, certain specific terms in connection with certain specific examples of my invention, it is to be understood that the present disclosure is illustrative rather than restrictive and that blocks of varying vertex angles and end face angles and having various configurations may be resorted to without departing from the spirit or scope of the claim which follows.

Having thus described my invention what I claim as new and useful and desire to secure by United States Letters Patent is:

A series-angle block adapted to fit a series of different flange angles comprising a generally frustum-shaped body having top and bottom contacts formed with flat bearing surfaces which lie in substantially parallel planes inclined with respect to a plane disposed at right angles to the longitudinal axis of said body, and a plurality of working contacts on the sides of said body, said contacts being inclined at different angles with respect to said flat bearing surfaces so as to provide a block having a series of differently inclined working contacts thereon, a disc of template stock secured to each of said bearing surfaces and having opposite contacts of equal dimensions which conform to the peripheral contour of said flat bearing surfaces, the edges of said discs being disposed at right angles to the contacts thereof.

References Cited in the file of this patent

UNITED STATES PATENTS

| | | |
|---|---|---|
| 2,419,134 | Hall | Apr. 15, 1947 |
| 2,430,613 | Hodge | Nov. 11, 1947 |
| 2,676,413 | Wharton | Apr. 27, 1954 |
| 2,686,371 | Flis | Aug. 17, 1954 |
| 2,692,462 | Robertson | Oct. 26, 1954 |

FOREIGN PATENTS

| | | |
|---|---|---|
| 716,337 | France | Dec. 18, 1931 |
| 581,435 | England | Oct. 11, 1946 |

OTHER REFERENCES

American Machinist, p. 153, Mar. 1, 1933.